(12) United States Patent
Kershman et al.

(10) Patent No.: US 6,258,395 B1
(45) Date of Patent: Jul. 10, 2001

(54) METHOD FOR PRESSURE BAKING

(75) Inventors: Alvin Kershman, Paradise Valley; Jeff Lynn Shear, Chesterfield, both of MO (US); Evan Harold Schlessinger, New York, NY (US); Ronald David Mogel, Indian Wells, CA (US)

(73) Assignee: SMTM Group, LLC, Chesterfield, MO (US)

( * ) Notice: Subject to any disclaimer, the term of this patent is extended or adjusted under 35 U.S.C. 154(b) by 0 days.

(21) Appl. No.: 08/950,984

(22) Filed: Oct. 15, 1997

(51) Int. Cl.[7] .................. A21B 5/00; A21D 8/00
(52) U.S. Cl. ............... 426/496; 99/427; 99/373; 426/523
(58) Field of Search .................. 426/496, 512, 426/523; 99/426, 427, 373; 249/78

(56) References Cited

U.S. PATENT DOCUMENTS

| | | | |
|---|---|---|---|
| 2,378,950 | * 6/1945 | Reich | 426/523 |
| 5,400,698 | 3/1995 | Savage | 99/439 |
| 5,786,013 | * 7/1998 | Kloppenburg et al. | 99/427 |
| 6,013,300 | * 1/2000 | Reichkitzer et al. | 426/523 |

FOREIGN PATENT DOCUMENTS 1411762  10/1975  (GB) .
WO 95/28086  * 10/1995  (WO) .

* cited by examiner

Primary Examiner—George C. Yeung
(74) Attorney, Agent, or Firm—Mike Pritzkau; Steve Shear

(57) ABSTRACT

A method of producing a comestible and associated apparatus are disclosed. A baking mixture is prepared having a moisture content. A mold arrangement is then provided having a mold cavity which is sealable from ambient pressure. The baking mixture is placed in the mold cavity and the mold cavity is then sealed. Thereafter, the mold arrangement is heated with the baking mixture therein such that pressure in the mold cavity rises above ambient pressure and a substantial portion of the moisture content in the baking mixture remains in the mold cavity as the baking mixture heats to form the comestible. In one aspect, the baking mixture is formulated to have a density which is approximately equal to the desired density of the comestible to be produced. Thereafter, the mold cavity of the mold arrangement is substantially filled with the density controlled baking mixture. Baking is performed under pressure such that the density controlled baking mixture is not permitted to expand significantly and the moisture content of the density controlled baking mixture is substantially retained thereby producing a comestible having substantially the same density and moisture content as the density controlled baking mixture.

16 Claims, 3 Drawing Sheets

US 6,258,395 B1

METHOD FOR PRESSURE BAKING

BACKGROUND OF THE INVENTION

The present invention relates generally to a method and apparatus for producing comestibles using pressure baking. The method and apparatus are particularly well suited for producing toaster stable comestibles which may be frozen or which may be formulated to include an extended shelf life.

Food products which may be prepared by heating in a toaster have become increasingly popular for reasons including convenience and swift preparation in a fast paced society. Products which are currently produced and designed for re-heating in a toaster include sliced bread, pancakes, french toast and waffles. Unfortunately, however, most other variations of baked products are not well suited for re-heating in a toaster. These products include, but are not limited to, cookies, muffins, most cakes and biscuits. Cookies when re-heated in a toaster will often lose structure, fall apart, and often create a fire hazard. Muffins, though certain types are sliced and toasted, are not designed for optimum toasting in an upright toaster. Most cakes, with the exception of very heavy cakes like a pound cake, cannot produce slices that have appropriate physical integrity. That is, cake slices that are thin enough for upright toasting have a tendency to fall apart in the toaster. Biscuits, if made thin enough, can be reheated in a toaster, but are not designed for easy removal and/or optimum taste characteristics. Moreover, biscuits readily become too dry when prepared in an upright toaster. Also, in an upright toaster, fillings and coatings can be problematic, particularly if they come in contact with the heating grid surface.

In an attempt to provide a broader base of baked goods suitable for re-heating in a toaster, shelf stable and frozen toaster pastries have been developed. Shelf stable toaster pastries include a low moisture pastry surrounding a relatively small amount of low moisture filling. Toppings have been designed for shelf stable pastries that are based on very low moisture starch/sugar suspensions that will not rub off on the heated toaster grating. Shelf stable toaster pastries definitely fill a need in terms of convenience and provide excellent physical integrity in the toasting process, but it is submitted that these products are not particularly appealing when compared with fresh baked goods.

Frozen toaster pastries, on the other hand, are excellent formulations of a toaster stable formula and include a more traditional pastry shell with superior eating properties as compared with the shelf stable products. Unfortunately, however, fillings for frozen toaster pastries are limited in nature to what is appropriate within a pastry shell. Moreover, the process required to make frozen toaster pastries is quite specialized. Even with the availability of shelf stable and frozen toaster pastries, a very limited variety of toaster friendly products are currently available in view of the popularity and demand for such products in the consumer marketplace.

In general, it is submitted that current baking processes do not provide for a broad line of products which may be safely and conveniently heated in an upright toaster. The present invention, in contrast, provides a highly advantageous method and associated apparatus which is capable of producing a wide array of products which are inherently suitable for re-heating in an upright toaster.

SUMMARY OF THE INVENTION

A method of producing a comestible and associated apparatus are disclosed. In accordance with the present invention, a baking mixture is prepared having a moisture content. A mold arrangement is then provided having a mold cavity which is sealable from ambient pressure. The baking mixture is placed in the mold cavity and the mold cavity is then sealed. Thereafter, the mold arrangement is heated with the baking mixture sealed therein such that pressure in the mold cavity rises above ambient pressure and a substantial portion of the moisture content in the baking mixture remains in the mold cavity as the baking mixture heats to form the comestible.

In one aspect of the invention, the baking mixture is formulated to have a density which is approximately equal to the desired density of the comestible to be produced. Thereafter, the mold cavity of the mold arrangement is substantially filled with the density controlled baking mixture. Baking is performed under pressure such that the density controlled baking mixture is not permitted to expand significantly and the moisture content of the density controlled baking mixture is substantially retained thereby producing a comestible having substantially the same density and moisture content as the density controlled baking mixture.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
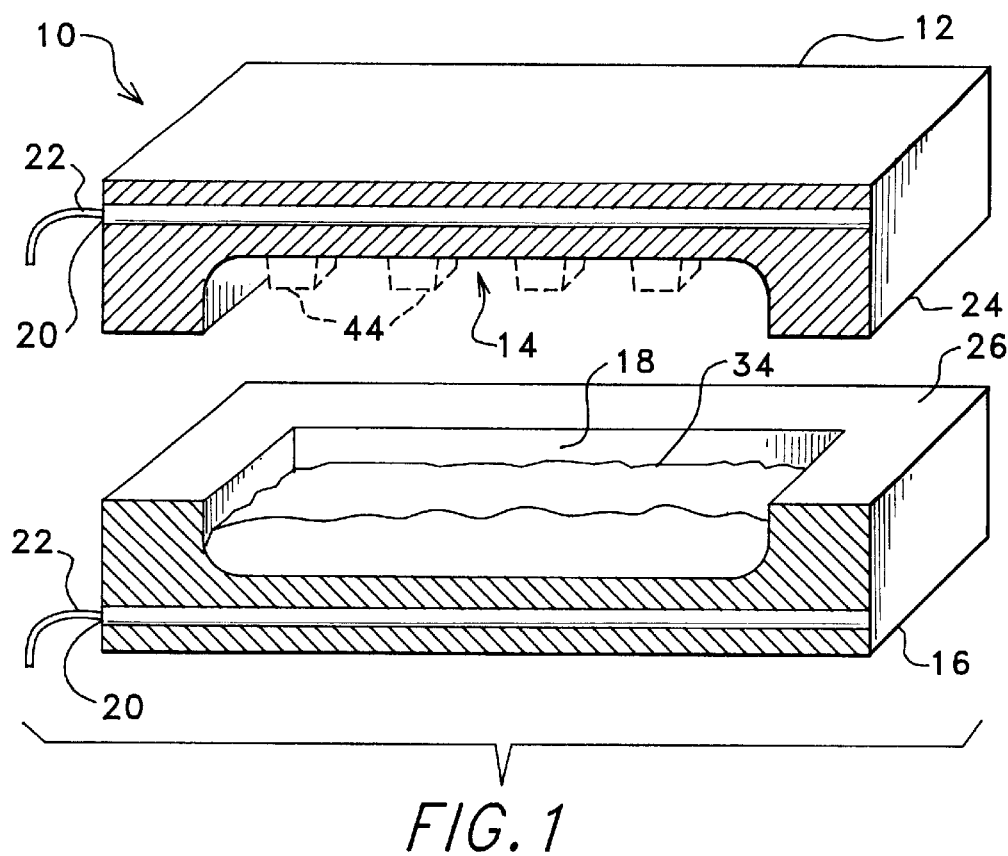
FIG. 1 is a diagrammatic perspective representation, in cross-section, showing a split mold arrangement which is manufactured in accordance with the present invention showing an upper mold half in a position that is separated from a lower mold half.

Attention is immediately directed to FIG. 1, which diagrammatically illustrates, in cross-section, one embodiment of a split mold arrangement manufactured in accordance with the present invention and generally indicated by the reference numeral 10. Split mold arrangement 10 includes an upper mold half 12 defining an upper mold recess 14 and a lower mold half 16 defining a lower mold recess 18. An electrical heating element 20 is positioned within each mold half Electrical power is supplied to heating elements 20 by electrical cables 22. The upper and lower mold halves may be formed from any suitable material such as, for example, stainless steel. Heating elements may be of any suitable configuration and arranged on or in the mold halves in any suitable manner provided only that the elements are in direct contact with the mold halves and the latter are heated in a sufficiently uniform manner. The heating elements should be capable of maintaining temperatures at the surfaces defining the mold recesses in the range of approximately 250° F. to 700° F.

Figure 2:
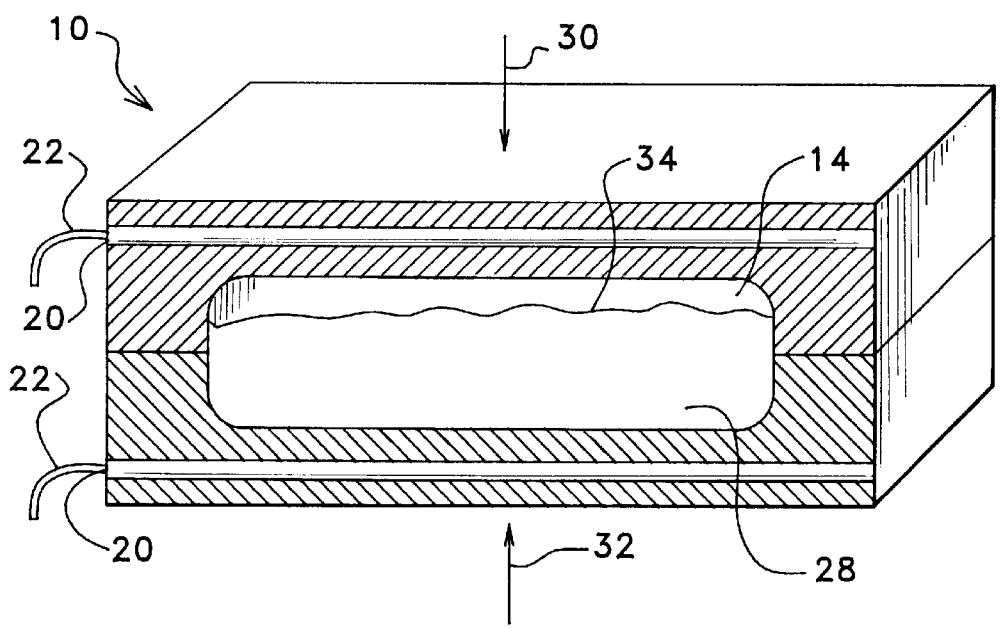
FIG. 2 is a diagrammatic perspective representation, in cross-section, showing the split mold arrangement of FIG. 1 with the upper and lower mold halves in a contacting, closed position which serves to define a mold cavity.

Turning to FIG. 2 in conjunction with FIG. 1, the upper and lower mold halves include confronting surfaces 24 (not visible) and 26 (FIG. 1). It should be noted that the cross-sectional view of FIG. 1 shows approximately one half of the complete split mold arrangement 10 such that, when the mold halves are positioned as shown in FIG. 2 with surfaces 24 and 26 in direct contact, a mold cavity 28 is defined by upper mold recess 14 and lower mold recess 18. Moreover, surfaces 24 and 26 are machined to a predetermined degree of smoothness such that, when sufficient force is applied in the directions indicated by arrows 30 and 32, a pressure seal is achieved which seals mold cavity 28 from ambient pressure, as will be described in further detail hereinafter.

With continuing reference to FIGS. 1 and 2, a description of the operation of split mold arrangement 10 will now be provided. Initially, a pre-measured amount of a baking mixture 34 having a predetermined moisture content is placed into lower mold recess 18 with the upper and lower mold halves in the spaced apart position of FIG. 1. As will be described in detail at an appropriate point below, baking mixture 34 may comprise any form of dough, batter or preformed "dough ball" which surrounds a filling or any suitable food product. Generally, it is desirable to preheat the mold halves before inserting the baking mixture. The mold halves may, of course, be treated with a suitable release agent prior to placing the baking mixture into the lower mold recess. Thereafter, the mold halves are brought into the closed position of FIG. 2.

With the mold halves in their closed position and upon achieving a sufficient seal between the mold halves, the baking mixture is baked in a highly advantageous way. Specifically, it should be appreciated that molding arrangement 10 provides for pressurized baking versus standard oven baking. Since the moisture content of the baking mixture is permitted to escape from the mold cavity only to a limited extent, evaporation of the moisture content of the baking mixture does not serve as a significant factor in cooling the baking mixture. Therefore, rapid baking is achieved by holding the baking mixture at a higher temperature (compared with conventional baking) under vapor pressure, greater than ambient pressure, which results from the moisture content of the baking mixture. Pressures of 0.5 psi to more than 20 psi above ambient pressure are readily achieved using mold arrangement 10. These pressures are accompanied by increases in baking temperature of 5° F. to more than 80° F. above interior article temperatures as compared to a conventional baking environment. Moreover, the continuing presence of the moisture content of the baking mixture within the mold cavity advantageously prevents burning. It is to be understood that some small portion of the moisture content of the baking mixture may be permitted to escape from mold cavity 28 (i.e., the seal between the upper and lower mold halves may actually serve to regulate the desired baking pressure) while achieving the advantages described above and still further advantages to be described below.

Figure 3:
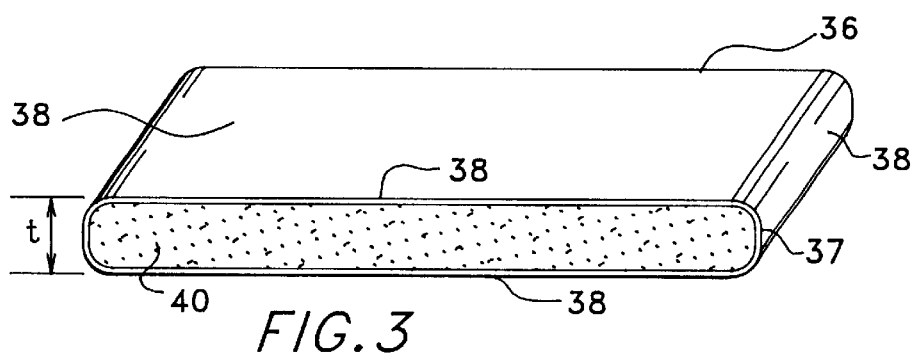
FIG. 3 is a diagrammatic perspective view, in cross-section, illustrating a baked article produced using the mold arrangement of FIGS. 1 shown here to illustrate the advantages of the present invention.

Referring to FIGS. 1–3, once baking mixture 34 has been baked, the baked article 36 is removed from molding arrangement 10 by placing the upper and lower mold halves in the open position shown in FIG. 1. It should be mentioned that one advantage of split molding arrangement 10 resides in its ability to produce baked article 36 such that it includes appealing shaped edges 37. It should be appreciated that baked articles made using molding arrangement 10 generally share certain highly advantageous characteristics, irrespective of the specific formula of the baking mixture. In particular, the cross-sectional view of FIG. 3, illustrates that baked article 36 exhibits a continuous, compressed thin shell 38 having a thickness which may range from $\frac{1}{64}$ inch up to approximately $\frac{1}{8}$ inch depending, for example, on the product formula, baking time and mold temperature. Thin shell 38 is produced as a result of the increased pressure within the mold cavity which forces the baking mixture against the heated mold surface such that the thin shell is dense and de-aerated relative to the interior 40 of baked article 36. At the same time, interior 40 of the baked article remains relatively moist, depending, of course, on the moisture content of the baking mixture used to form the baked article, Since thin shell 38 is relatively strong as a result of its compressed, de-aerated nature, it serves to support the relatively moist interior of the article.

Still referring to FIGS. 1–3, further strength is imparted to the thin shell as a result of characteristics including caramelization and crystallization as a result of contact between the baking mixture and the heated mold surfaces. These characteristics are attributed to the known interaction, under heat, of sugars and proteins within the baking mixture. When the baked article of the present invention is placed into a toasting environment, the de-aerated thin shell absorbs heat rapidly, eliminating moisture from the surface while simultaneously serving to encapsulate moisture in the interior of the baked article. Therefore, dry out of the article's interior is minimized during toasting. Still further advantages of the present invention will be described immediately hereinafter.

Referring solely to FIG. 3, it has been discovered that thin shell 38 is particularly advantageous in the production of toaster friendly frozen articles. In particular, the thin shell has been shown to re-conform to the original mold structure when re-heated in a standard toaster. In contrast, standard baking or broiling processes do not provide such an equivalently dense, de-aerated outer crust film. Products produced using standard baking processes and frozen in a deformed shape, therefore, tend to remain in such a deformed shape following toasting. In addition, the crust on such products offers little in the way of a moisture retaining barrier such that the fillings in these standardly produced products have a tendency to dry out. It should be mentioned that this problem is exacerbated with regard to frozen products since they are typically placed in a toaster in a frozen state. Toasting time is significantly increased for frozen products since the filling must not only be heated, but thawed. In this regard, it is noted that primary size restrictions for baked articles intended to be frozen and produced using the present invention are established in view of the time required for re-heating from the frozen state. One useful set of dimensions for frozen baked articles has been found to be a thickness t of $\frac{3}{8}$ inch to $\frac{5}{8}$ inch and an overall rectangular shape of approximately 3 inches by 5 inches. Alternatively, the overall shape may be circular, having a diameter of approximately 4 inches to 5 inches. Of course, any desired shape may be produced with an appropriately shaped mold cavity.

In considering the wide array of products, including shelf stable products, which may be produced in accordance with the present invention, mold cavity volume may vary from less than 3 cubic inches to 25 cubic inches or more in view of size limitations imposed by a typical upright toaster. With regard to minimum volume, it should be remembered that the mold configuration should be established so as to provide a baked article which includes a moist center. If for example, the product is too thin, a primarily crust based item (i.e., mostly comprised of a thin shell) will be produced. With regard to maximum volume, a thickness of 1 inch with a height and width of 5 inches is considered as maximum size for a standard upright toaster. However, larger sizes may be produced for non-standard toasters.

Continuing with a description of the advantages derived in using mold arrangement 10, it should be appreciated that baking times are significantly reduced. For example, items such as cookies and muffins can be baked in approximately one-half the time required by conventional processes. Moreover, baking time is consistent across a wide variety of different formulas. It is anticipated that most articles will bake in the molding arrangement of the present invention within approximately 4–6 minutes, as compared with times ranging from 8–30 minutes in conventional oven processing. In addition, the need for large continuous production ovens is eliminated. It is submitted that significant production savings will be realized for this reason alone.

As noted above, the present invention is highly advantageous in its ability to produce upright toaster compatible baked items essentially irrespective of the baking mixture which is used. It should be appreciated that the present invention contemplates the production of items such as, for example, muffins, cookies, brownies, yeast pastry, biscuits and scones, cakes (ranging from pound cake to very light sponge cake), soda breads, yeast breads (sweet and non-sweet) and filled dough products which may be filled with sweet or non-sweet fillings. These products, when produced in accordance with the teachings herein, will not fall apart or break down while being toasted in a standard upright toaster and will maintain product integrity during removal from the toaster. It should also be mentioned that even though the present invention is essentially universal in consistently producing baked items irrespective of the type of baking mixture used, it remarkably provides that each of these items retains its expected taste, texture and eating characteristics. In and by itself, this feature is highly advantageous.

Referring again to FIG. 1, molding arrangement 10 may include one or more features which result in the formation of cavities or depressions in the surface of the baked article to be produced. For example, projecting mold features 44 are shown as dashed lines in the upper mold recess such that a corresponding pattern of indentations is formed in the baked article produced thereby (not shown). It should also be appreciated that a variety of specialty products can be produced by filling these cavities. For example, these products include pizza and fruit filled danish suitable for vertical toasting. It should also be appreciated that the present invention provides the ability to manufacture baked articles in a way which further enhances consumer appeal of known products. For example, mold arrangement 10 may be configured to form a "hybrid" muffin which has two tops, since it is submitted that consumers prefer to eat the top portion of a conventional muffin. Still further advantages of the present invention will become apparent in the remaining discussion.

Figure 4:
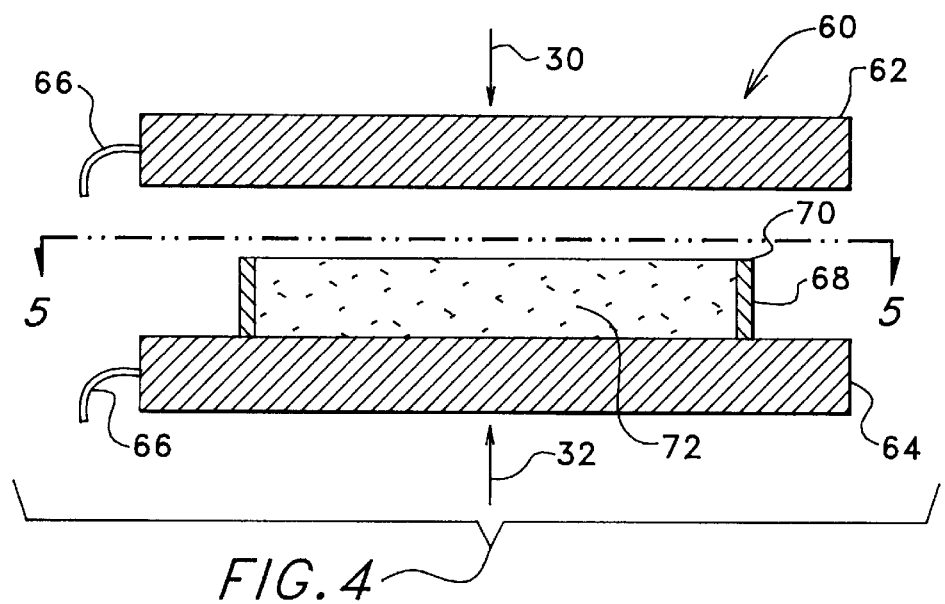
FIG. 4 is a diagrammatic view, in cross-section of a ring mold arrangement which is manufactured in accordance with the present invention.
Figure 5:
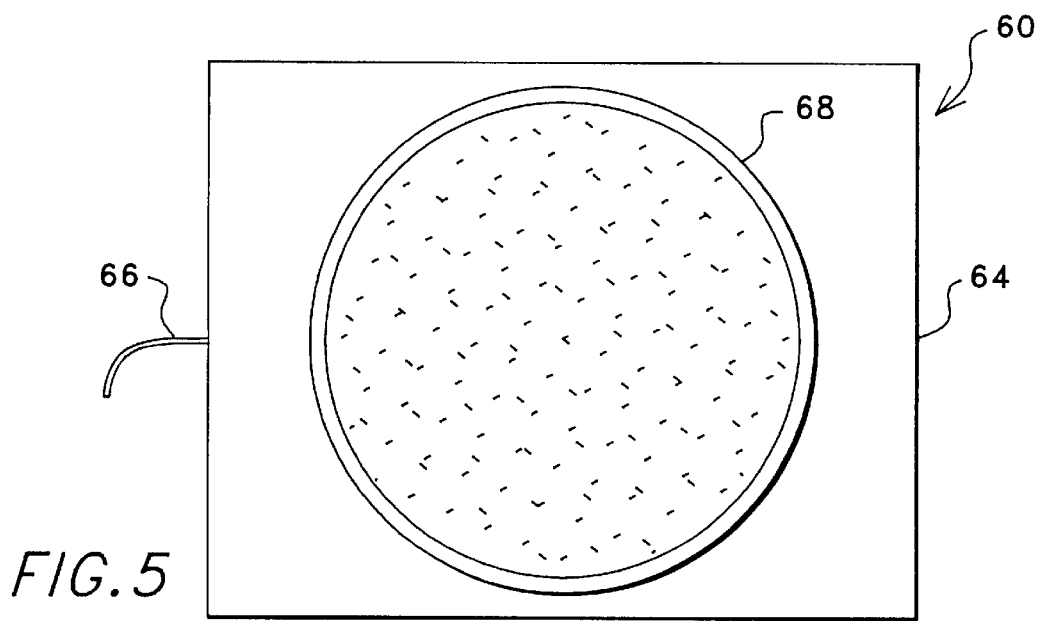
FIG. 5 is a diagrammatic plan view of a lower heated platen and steel ring mounted thereon which form part of the ring mold arrangement of FIG. 4.

Turning now to FIGS. 4 and 5, one embodiment of a ring mold arrangement manufactured in accordance with the present invention is generally indicated by the reference numeral 60. Ring mold arrangement 60 includes an upper platen 62 and a lower platen 64. The upper and lower platens include associated heating elements which are not shown for purposes of simplicity and which are readily providable by one of ordinary skill in the art. Power cables 66 provide electrical power to the platens. The platens are generally formed from materials such as, for example, stainless steel. A steel ring 68 is mounted on the upper surface of lower platen 64, for example, by welding. It is to be understood that ring 68 need not be circular in form. In fact, any desired shape may be used. Dimensions including the diameter of ring 68 and its height may be established in view of the foregoing discussions. Steel ring 68 includes an upper edge 70 such that when the upper and lower platens are moved (not shown) in the directions indicated by arrows 30 and 32, respectively, a pressure seal is attained between the upper edge of the steel ring and the lower surface of the upper platen. In this way, a molding cavity 72 is defined which may receive baking mixture 34 in the same manner as previously described split mold arrangement 10.

Still referring to FIGS. 4 and 5, in the sealed position, heat is transferred from the upper and lower platens into steel ring 68 such that consistent baking temperatures are produced. While other types of metal may be found to be useful in forming ring 68, it has been found that steel produces excellent results. The use of an aluminum ring was found to be unsatisfactory, resulting in inconsistent baking due to excessive heat dissipation caused by the aluminum. One of skill in the art will appreciate that ring mold 60 operates in essentially the same manner as previously described split mold arrangement 10. Moreover, baked articles produced by ring mold arrangement 60 share all of the advantages of articles produced by mold arrangement 10. Therefore, descriptions of baking operations and the advantages of baked articles produced in accordance with the present invention will not be repeated for purposes of brevity and the reader is referred to previously appearing discussions. However, at the same time, one aspect of ring mold arrangement 60 has been found to be particularly advantageous, as will be described immediately hereinafter.

In one technique for using ring mold arrangement 60, in accordance with the present invention, a density controlled baking mixture is formulated with a density which is equivalent to that of the finished baked article to be produced using that baking mixture. Density of the mixture can be controlled, at least in part, by pre-aerating or whipping the baking mixture. In using the density controlled baking mixture, ring 68 is entirely filled with the mixture as illustrated in FIG. 4. Thereafter, the upper platen is sealed against upper edge 70 of ring 68 and baking proceeds. The density and moisture content of the resulting baked article are, therefore, equivalent to that of the baking mixture used to produce it. It is submitted that this technique ensures consistent results and provides significant advantages over prior art baking methods.

Referring briefly again to FIG. 1, it should be appreciated that a single mold configuration filled entirely with the baking mixture may readily be provided by simply eliminating upper mold recess 14. In this way, the technique described in the discussion immediately above may be employed in which lower mold recess 18 can be completely filled with a density controlled baking mixture.

Figure 6:
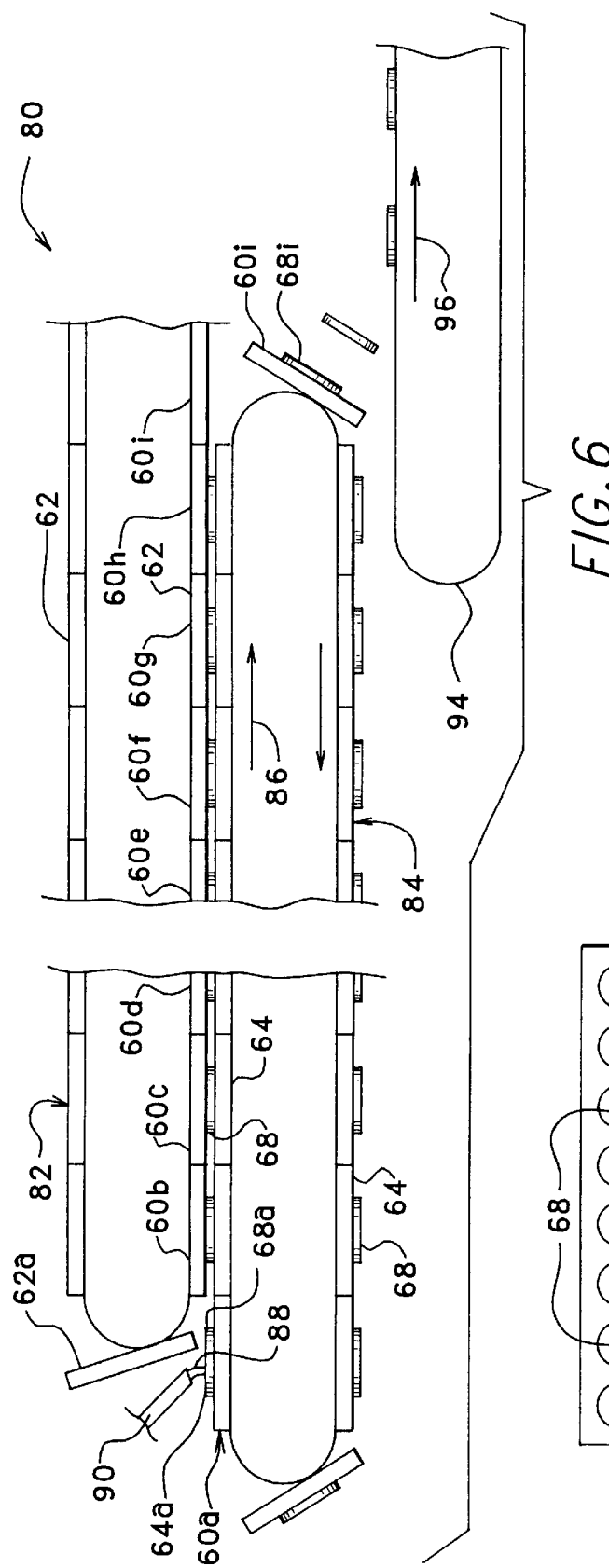
FIG. 6 is a diagrammatic view, in elevation, of an automated production system which incorporates a plurality of ring molds of the type illustrated in FIGS. 4 and 5.

Attention is now directed to FIG. 6 which illustrates an automated system, generally indicated by the reference numeral 80, for producing baked articles in accordance with the present invention. System 80 includes an upper platen conveyor 82 and a lower platen conveyor 84. For the reason that assembly 10 utilizes a number of components which are identical to those which make up previously described ring mold arrangement 60, like reference numbers are applied to like components wherever possible and the reader is referred to previously appearing descriptions of these components. Upper platen conveyor 82 carries a plurality of upper platens 62. Lower platen conveyor 84 carries a plurality of lower platens 64 each of which includes steel ring 68 installed thereon. During the operation of the system, the lower portion of the upper platen conveyor moves in unison with the upper portion of the lower platen conveyor in the direction indicated by an arrow 86.

Still referring to FIG. 6, the upper and lower platen conveyors are arranged in proximity with one another such that a steel ring 68a of a first ring mold arrangement 60a is open to receive a suitable baking mixture. In the present example, a predetermined amount of a batter 88 is dispensed into steel ring 68a by a nozzle 90. Thereafter, as both of the conveyors move, the upper platen 62a, which forms part of ring mold arrangement 60a, comes around the end of the upper platen conveyor so as ultimately be brought into contact (not shown) with ring 68a once movement of the conveyors brings ring mold 60a to the position in which a ring mold 60b is shown in the figure. At this position, each steel ring 68 is sealed by its respective upper platen 62 as a result of the proximity of the upper and lower conveyors such that baking may then proceed under pressure in accordance with the teachings of the present invention, as described above. Of course, electrical power is provided as appropriate during the automated process being described. A series of ring mold arrangements 60c through 60h are shown ahead of the position of ring mold arrangement 60b.

As each of these ring molds reaches the far end of the lower platen conveyor, baking is complete and the baked article within a particular ring mold arrangement is ready to be removed. In the present example, ring mold arrangement 60i is shown travelling around the end of the lower platen conveyor. As it does so, steel ring 68i separates from upper platen 62i and, thereafter, a baked article 92 simply falls out of ring mold 60i and onto a product conveyor 94 which is moving in the direction indicated by an arrow 96, for example, to transport the baked article to a packaging operation. It should be appreciated that a step such as, for example, cooling the baked articles along a latter section of the upper and lower platen conveyors is readily incorporated in the manufacturing operation shown in the figure. Cooling may simply involve turning off electrical heating power to the upper and lower platens of the ring mold arrangements at an appropriate point along the production line and/or routing the conveyors, for example, through a cooling tunnel (not shown). In the instance where the baked article includes indentations/cavities produced, for example, by projecting mold features 44 (FIG. 1) an additional step in the manufacturing process may include filling the indentations with a pre-selected filling in a known manner.

It should be appreciated that automated system 80 represents a high throughput, energy efficient utilization of the teachings of the present invention. This system is intended as exemplifying only one form of an automated system which employs the teachings of the present invention. Therefore, any number of modifications (none of which are shown) may be performed on this system while remaining within the scope of the present invention. For example, previously described split mold arrangement 10 or another such suitable mold arrangement may be used in place of the plurality of ring mold arrangements used along the upper and lower platen conveyors. As another example, a dough ball or filled dough ball may be placed into the mold by known apparatus such as mechanical fingers. As still another example, the baked article may be removed at the end of the production line by mechanical fingers in a way which avoids damaging the baked article as a result of falling. In yet another example, the baked article might be removed from the ring molds by creating a vacuum between the upper platen and the baked article. The latter may then be released by releasing the vacuum at an appropriate time.

Figure 7:
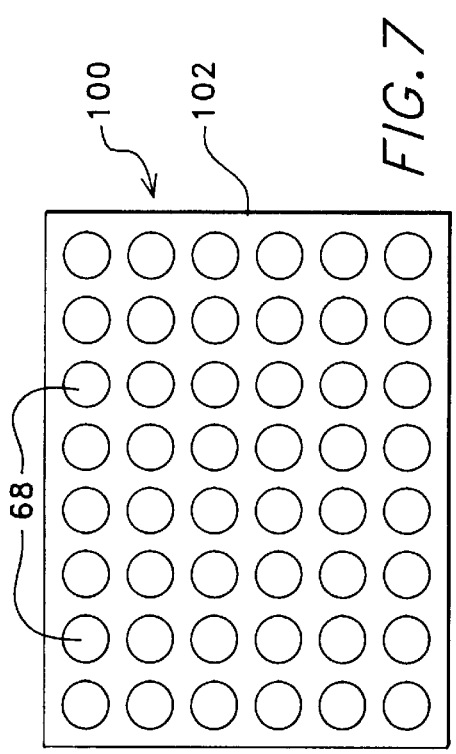
FIG. 7 is a diagrammatic plan view of a production mold arrangement manufactured in accordance with the present invention.

Turning to FIG. 7, a production mold arrangement 100 is illustrated. Mold arrangement 100 includes a large heated lower platen on which are positioned a plurality of steel rings 68. One of skill in the art will recognize that mold arrangement 100 is used in the same manner and shares the same advantages as one of previously described split mold arrangements 10 or ring, mold arrangements 60 except that a plurality of mold cavities 102 are provided for simultaneous use. After placing a predetermined portion of baking mixture (not shown) into cavities 102, the latter are covered by a large heated upper platen which is not shown for purposes of clarity. It is noted that a plurality of individual heated upper platens may be used as wherein each cavity 102 is sealed by an individual upper platen. While arrangement 100 has been described using the ring mold configuration of FIGS. 4 and 5 (i.e., each mold cavity is essentially defined by one of the mold halves), it should be appreciated that the use of a split mold configuration or any other suitable, pressure retaining configuration is contemplated.

From the foregoing discussions, it is evident that the present invention provides a universal process for the production of toaster compatible baked articles which exhibits consistent results across a wide range of baking mixture formulations. Therefore, a great variety of different products may advantageously be produced using one relatively simple apparatus. Moreover, the present invention contemplates efficiency and high throughput by dramatically reducing baking times as compared with conventional oven baking. It should be mentioned that while the present invention directly addresses the production of toaster compatible products, these products are suitable for re-heating in other ways such as, for example, by using a toaster oven.

One skilled in the art may devise many alternative configurations for the arrangements and methods disclosed herein. Therefore, it should be understood that the present invention may be embodied in many other specific forms without departing from the spirit or scope of the invention and that the present examples and methods are to be considered as illustrative and not restrictive, and the invention is not to be limited to the details given herein, but may be modified within the scope of the appended claims.

What is claimed is:

1. A method of producing a comestible, said method comprising the steps of:

a) preparing a baking mixture having a moisture content;

b) providing a mold arrangement including a mold cavity which is sealable from ambient pressure, the mold arrangement having first and second mold members which define said mold cavity when positioned in a confronting relationship;

c) placing the baking mixture in one of the first and second mold members and thereafter positioning the first and second mold members in said confronting relationship;

d) sealing said mold cavity so as to seal the mold cavity sufficiently to allow pressure and temperature to rise above ambient levels; and e) heating the mold arrangement including the baking mixture such that pressure in the mold cavity rises above ambient pressure and a substantial portion of said moisture content in the baking mixture remains in the mold cavity as the baking mixture heats to form said comestible and such that a portion of the baking mixture is forced against the interior wall of the mold arrangement to form said portion of the baking mixture into a de-aerated thin shell which surrounds an interior portion of the comestible.

2. The method of claim 1 further comprising the step of:

e) separating said first and second mold members after said comestible is formed by said heating step and thereafter removing the comestible.

3. The method of claim 1 further comprising the steps of:

e) cooling the mold arrangement and said comestible therein; and f) separating said first and second mold members after said comestible is formed and thereafter removing the comestible from the mold halves.

4. A method of producing a baked food product, said method comprising the steps of:

a) preparing a baking mixture having a moisture content;

b) providing a mold arrangement including an interior wall defining a mold cavity;

c) placing the baking mixture in said mold cavity; and d) heating the mold arrangement including the baking mixture within the mold cavity in a way which causes the pressure and temperature to rise above ambient levels while substantially retaining said moisture content so as to force a portion of the baking mixture against the interior wall of the mold arrangement to form said portion of the baking mixture into a de-aerated thin shell which surrounds an interior portion of the baked product.

5. The method of claim 4 wherein said baking mixture is placed in the mold cavity so as to substantially fill the mold cavity with the baking mixture such that the sealed mold cavity is substantially filled with the baking mixture.

6. The method of claim 5 wherein said step of preparing said baking mixture includes a step of formulating said baking mixture such that the baking mixture includes a predetermined density such that, after said heating step with the mold cavity substantially filled, the product includes a baked density which is substantially equal to the predetermined density of the baking mixture.

7. The method of claim 4 wherein the mold cavity is sufficiently sealed during said heating step such that the moisture content of the baked product is substantially equal to a pre-baked moisture content of the baking mixture.

8. A method of producing a comestible, said method comprising the steps of:

a) preparing a baking mixture having a moisture content;

b) providing a mold arrangement including an interior wall defining a mold cavity, said mold arrangement being movable between a series of stations;

c) at a first one of said stations, placing said baking mixture in said mold cavity;

d) moving the mold arrangement to a second one of said stations such that said mold cavity is closed at said second station; and e) moving the mold arrangement between said second station and a third one of said stations while heating the mold arrangement including the baking mixture and substantially retaining moisture content so as to allow pressure and temperature to rise above ambient levels in a way which forces a portion of the baking mixture against the interior wall of the mold arrangement to form said portion of the baking mixture into a de-aerated thin shell which surrounds an interior portion of the baked product.

9. The method of claim 8 wherein said baking mixture is placed in the mold cavity so as to substantially fill the mold cavity with the baking mixture such that the sealed mold cavity is substantially filled with the baking mixture.

10. A baked food product made in accordance with the process of claim 4.

11. The method of claim 1 wherein the continuing presence of the moisture content of the baking mixture within the mold cavity serves to prevent burning of the baking mixture during the heating step.

12. The method of claim 4 wherein the continuing presence of the moisture content of the baking mixture within the mold cavity serves to prevent burning of the baking mixture during the heating step.

13. The method of claim 4 wherein the baking temperature of the baking mixture is held from 5° F. to more than 80° F. above a normal interior temperature of that baking mixture when the latter is baked using conventional oven baking.

14. The method of claim 4 wherein further strength is imparted to the thin shell as a result of characteristics including caramelization and crystallization from contact between the baking mixture and the heated mold interior wall.

15. The method of claim 4 further comprising the step of reheating the baked food product such that the de-aerated thin shell absorbs heat rapidly, eliminating moisture from the surface of the thin shell while simultaneously serving to encapsulate moisture in the interior of the baked food product.

16. The method of claim 8 wherein said step of preparing said baking mixture includes a step of formulating the moisture content of said baking mixture such that the baking mixture includes a predetermined density and wherein said step of placing the baking mixture in the mold cavity includes a step of filling the mold cavity with the baking mixture such that, after said heating step, the baked article includes a baked density which is substantially equal to the predetermined density of the baking mixture.

* * * * *